United States Patent [19]
Klopotek

[11] Patent Number: 5,109,465
[45] Date of Patent: Apr. 28, 1992

[54] BEAM HOMOGENIZER

[75] Inventor: Peter J. Klopotek, Framingham, Mass.

[73] Assignee: Summit Technology, Inc., Waltham, Mass.

[21] Appl. No.: 465,027

[22] Filed: Jan. 16, 1990

[51] Int. Cl.$^5$ .............................................. G02B 6/00
[52] U.S. Cl. .................................. 385/133; 385/125; 359/900; 250/503.1
[58] Field of Search .................... 250/503.1; 350/96.1, 350/96.15, 96.28, 96.32; 385/15, 88, 125, 133

[56] References Cited

U.S. PATENT DOCUMENTS

| | | | |
|---|---|---|---|
| 4,482,214 | 11/1984 | Hill et al. | 350/96.1 X |
| 4,551,628 | 11/1985 | Grossman | 250/503.1 |
| 4,657,169 | 4/1987 | Dostoomian et al. | 228/103 |
| 4,718,416 | 1/1988 | Nansumi | 128/303.1 |
| 4,733,944 | 3/1988 | Fahlen et al. | 350/167 |

FOREIGN PATENT DOCUMENTS

| | | |
|---|---|---|
| 0274205 | 7/1988 | European Pat. Off. . |
| 0280414 | 8/1988 | European Pat. Off. . |
| 3509421 | 9/1985 | Fed. Rep. of Germany . |
| 62-216216 | 9/1987 | Japan . |
| 2180363 | 3/1987 | United Kingdom . |

OTHER PUBLICATIONS

Simmons et al., *Optical Beam Shaping Devices Using Polarization Effects*, 1974, vol. 13, No. 7, pp. 1629-1632.
Cullis et al., *A Device For Laser Beam Diffusion and Homogenisation*, 1979.
Grojean et al., *Production Of Flat Top Beam Profiles For High Energy Lasers*, 1980, pp. 375-376.
Han et al., *Reshaping Collimated Laser Beams With Gaussian Profile to Uniform Profiles*, 1983, vol. 22, No. 22, pp. 3644-3647.
Deng et al., *Uniform Illumination Of Large Targets Using A Lens Array*, 1986, vol. 25, No. 3, pp. 377-381.
Ozaki et al., *Cylindrical Fly's Eye Lens for Intensity Redistribution Of An Excimer Laser Beam*, 1989, vol. 26, No. 1, pp. 106-110.

Primary Examiner—Frank Gonzalez
Assistant Examiner—John Ngo
Attorney, Agent, or Firm—Thomas J. Engellenner

[57] ABSTRACT

Disclosed is an apparatus and method for the modifying the intensity profile of radiant energy beam or reducing its spatial coherence, especially that produced by a laser. The apparatus includes a waveguide having a light reflecting surface including a substructure. The light reflecting surface and substructure reflect incident light causing chaotic scattering which acts to homogenize the intensity profile of the laser beam.

19 Claims, 2 Drawing Sheets

BEAM HOMOGENIZER

BACKGROUND OF THE INVENTION

This invention relates generally to optical systems, and, more particularly, relates to an apparatus and method for homogenizing radiant energy beams.

The use of lasers and other radiant energy sources has become commonplace in diverse fields, ranging from materials processing to surgery. In many applications, uniform illumination of the target surface, and hence, uniformity of the laser beam intensity profile is of paramount importance. Typical laser generating systems, however, produce laser output beams having spatially non-homogeneous intensity profiles. For example, the radiation may be most intense at the center of the beam and drop off sharply at the periphery, creating a cross-sectional profile resembling a bell-shaped curve similar to a Gaussian intensity profile. Other laser systems produce beams having ring-shaped or star-shaped profiles, which likewise are undesirable in many applications.

Most current work towards improvement of laser beam uniformity has been focused on the configuration of the laser beam generation system. Optical resonator design, excitation electrode design, and improvements in discharge preionization uniformity have increased output beam uniformity significantly. Nonetheless, few commercial lasers can maintain substantially uniform intensity profiles, particularly at high energy outputs Further complicating this problem is the presence of occasional, essentially unpredictable, changes in laser output beam uniformity on a shot-by-shot basis.

Additionally, laser beam non-uniformity can also be introduced during propagation of the beam. In particular, light processing elements, e.g., shutters, blinds, stops, and other similar optical components interposed along the propagation path of the beam can cause substantial distortion of the beam profile.

Several devices have been developed which attempt to improve beam uniformity during propagation between a laser beam source and target. These "homogenizing" devices can be generally categorized as either predictable or unpredictable. In predictable devices, beam homogeneity results from the predictable overlapping of an input beam as it propagates through the device; the homogeneity of the output beam is expressible as a function of the homogeneity of the input beam. In contrast, unpredictable devices cause chaotic overlapping of light rays to such an extent that the spatial coherence of the input beam is destroyed and the energy profile of the output beam becomes a function of the apparatus, i.e., the homogenizer, rather than the input beam.

Predictable light homogenizing apparatuses typically include kaleidoscopes, lens and prism systems, or waveguides having convoluted light transmission paths. (See, for example, Fahlen, U.S. Pat. No. 4,733,944; George et al., United Kingdom Patent Application Number 2,180,363; Telfair, European Patent Application 280,414; Grojean et al., "Production of Flat Top Beam Profiles for High Energy Lasers", 51 *Review of Scientific Instruments* 375 (March 1980), all incorporated herein by reference). Although useful in some applications, these apparatuses are generally unable to homogenize the large disturbances caused by light processing elements, e.g., shutters, blinds, stops, or other optical components. In addition, beams treated with these devices may exhibit speckle due to the constructive and/or destructive overlapping of the beam during homogenization.

Upredictable devices including, for example, translucent glass, ground glass, and various light scattering polymeric materials, can also be effective light homogenizers; however, such diffusion type devices are unsuitable for many applications. These devices are especially inappropriate for imaging systems due to the unacceptable light losses they produce.

It is an object of the present invention to provide an apparatus and method for homogenizing radiant energy beams regardless of the spatial distribution of the energy in the input beam and in a manner which reduces speckle but avoids the significant losses typically associated with diffusion-type homogenizing devices. Other general and specific objects of the invention will in part be obvious and will in part appear hereinafter.

SUMMARY OF THE INVENTION

The invention provides an apparatus and method for more efficiently homogenizing a beam having a non-uniform intensity profile or an undesirable degree of spatial coherence.

The apparatus includes a light transmissive waveguide comprising a light reflecting surface having a substructure which homogenizes the laser beam as it propagates along the waveguide by multiple internal reflections. The apparatus can be a solid light transmissive medium or a hollow channel having an inner, light transmitting passageway. The substructure can be disposed on the external surface of the solid medium or on the inner surface of the channel of the hollow waveguide. Preferably, the beam is aligned such that it enters the waveguide at an acute angle, e.g., from about 2 to about 6 degrees, relative to the longitudinal axis of the waveguide.

The method of homogenizing a non-uniform beam includes disposing the above-described homogenizing element along at least a portion of the propagation path between a laser beam source and a target. The laser beam is then projected through the homogenizing element and permitted, during propagation, to reflect off the light reflecting surface. The reflection of the laser beam off the substructure of the light reflecting surface homogenizes the beam, producing a uniform intensity profile.

Moreover, the present invention can be employed to reduce, or scramble, the spatial coherence of a laser beam. This feature of the invention is particularly useful in patterning or imaging processes, such as microlithography or holography, where the nearest absolute coherence of a laser beam can actually be undesirable. In such applications, the homogenizing apparatus and method disclosed herein can modify the degree of spatial coherence without introducing significant energy losses.

The invention will next be described in connection with certain illustrated embodiments; however, those skilled in the art will appreciate that various modifications, additions and subtractions may be made without departing from the spirit or scope of the claimed invention.

BRIEF DESCRIPTION OF THE DRAWINGS

For a fuller understanding of the nature and objects of the invention, reference should be made to the following detailed description and the accompanying drawings, in which.

DETAILED DESCRIPTION

Figure 1:
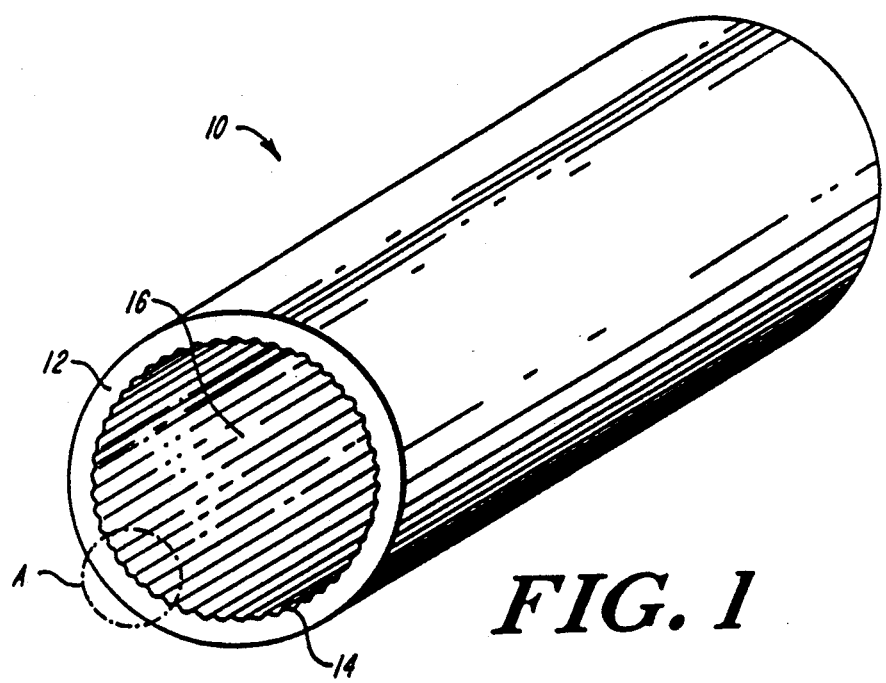
FIG. 1 is a perspective view of a beam homogenizer in accordance with the invention.

FIG. 1 discloses a waveguide 10 for homogenizing a radiant energy beam such as a laser. In particular, waveguide 10 can convert the non-uniform, e.g., Gaussian or otherwise variable, spatial profile of a typical laser beam into a substantially homogeneous spatial profile. Waveguide 10 includes a light reflecting surface 12 having a substructure 14, and a channel or medium 16.

Waveguide 10 may be formed of a solid or hollow light transmissive medium, and is typically several inches to feet in length. Useful solid transmissive media, familiar to those of ordinary skill in the art, include glass, quartz, and light transmissive polymeric materials. The appropriate solid media for a given wavelength of radiant light, i.e., laser beam, can be empirically determined. Hollow waveguides are generally preferred for use in conjunction with ultraviolet and infra-red radiation, where transmission losses are high for solid media, as well as for high intensity light transmission, generally. In operation, the channel 16 of waveguide 10 can be evacuated or, preferably, filled with an inert gas, e.g., nitrogen, to prevent oxidation of the light reflecting surface 12. The waveguide 10 can be maintained in such a controlled environment or it can be fitted with windows (preferably antireflection coated windows) to maintain a controlled ambient condition within the channel 16.

Figure 2:
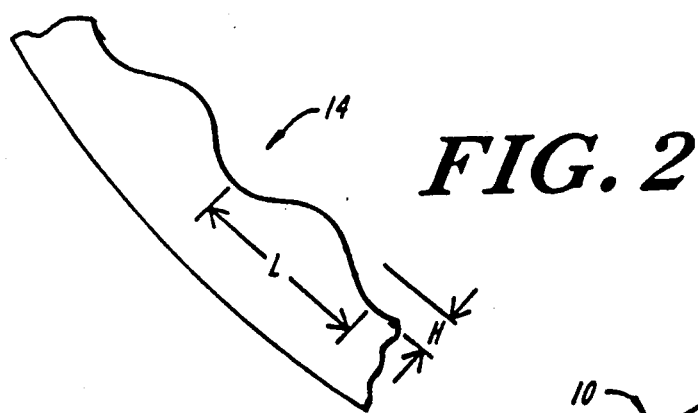
FIG. 2 is an enlarged side view of the encircled area denoted A in FIG. 1.

FIG. 2 discloses in greater detail the substructure 14. The substructure 14, which typically comprises a series of shallow undulating grooves, functions to homogenize the incident light. Preferred dimensions are chosen to optimize energy throughput, the speed of the convergence of the light to its final level of homogeneity, and the energy density of the light on the surface of the waveguide 10. The dimensions of the waveguide 10 and substructure 14 typically will be proportional to the maximum energy which can be transmitted by the waveguide 10 without damaging the light reflecting surface 12. The substructure 14 can also be rifled or twisted at an angle or pitch relative to a longitudinal axis of the waveguide. A rifled or twisted groove structure can, in some instances, reduce the total length of the waveguide 10 necessary to achieve homogenization. If rifled or twisted, it is preferred that the angle between the grooves and the longitudinal axis of the waveguide be sufficient to increase the randomization of the beam without causing backscattering.

For example, the waveguide 10 of FIG. 1 can be used to homogenize a beam comprising ultraviolet radiation at approximately 193 nanometers and 0.5 Joules/pulse. In this embodiment, the grooves of substructure 12 can have a height, denoted H in FIG. 2, of between about 0.006 and about 0.01 inches, preferably about 0.007 to about 0.009 inches. The length of the grooves, denoted L in FIG. 2, can be between about 0.06 and about 0.02 inches, preferably about 0.03 to about 0.05 inches. If the internal diameter of waveguide 10 is approximately 0.31 inches, the spacing between grooves can subtend an angle of about 7.2 degrees. Using these dimensions, if the energy throughput of the beam is decreased to 0.25 Joules/pulse, the dimensions can be decreased by a factor of two.

The location of the light reflecting surface can be altered depending upon the media chosen. In hollow waveguides, light reflecting surface is preferably positioned on the internal surface of the lumen which defines channel. For waveguides manufactured from a solid media, the light reflecting surface can be located on the external or peripheral surface of the waveguide.

The light reflecting surface can be coated with a reflective material. Typical coating materials include gold, silver or aluminum overcoated with a glass compound. Aluminum with a magnesium glass, such as magnesium fluoride overcoating is one preferred material as it retains high reflectivity.

Figure 3:
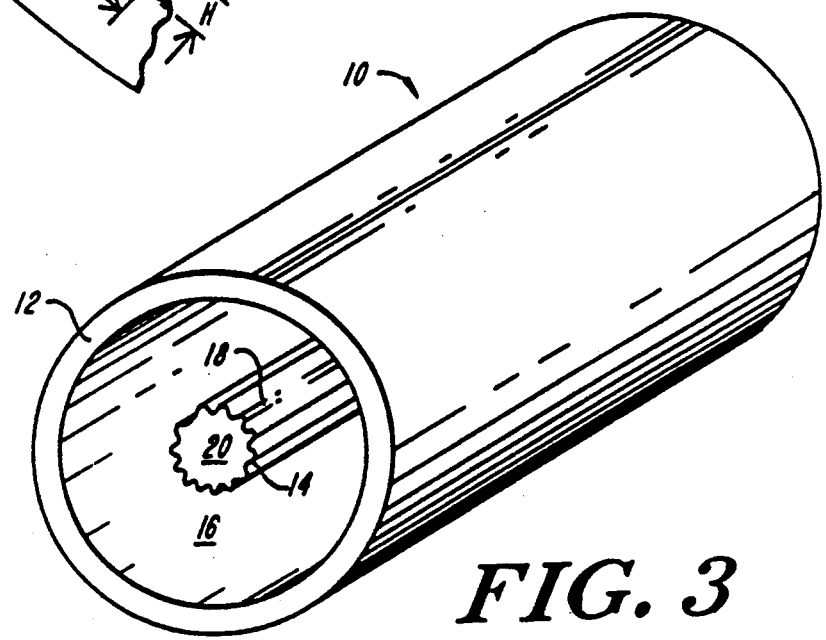
FIG. 3 is a perspective view of a second beam homogenizer in accordance with the invention.

FIG. 3 discloses a waveguide 10 having an annular cross-sectional. The waveguide 10 of this embodiment can have an internal light reflective surface or an external light reflective surface 12 or both. For example, substructure 14 can be located on the inner light reflecting surface 18, as shown. Alternatively, the substructure can be located on surface 12 in a manner similar to that shown in FIG. 1. Again, channel 16 can be a solid medium or a hollow passageway. In operation it is preferred that the laser light enter the annular waveguide 10 of FIG. 3 so as to avoid the central region 20.

Figure 4:
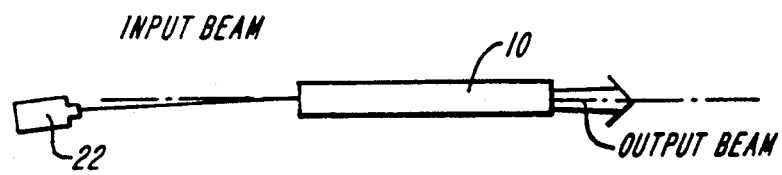
FIG. 4 is a schematic diagram of a beam homogenizer in accordance with the invention.
Figure 5:
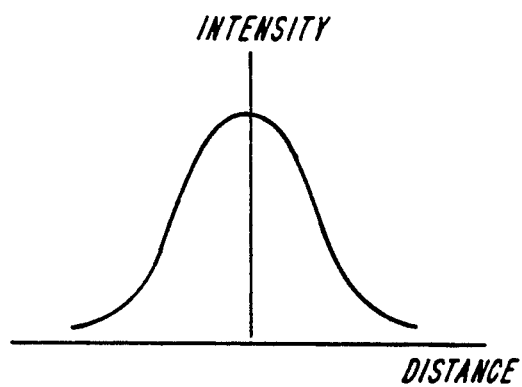
FIG. 5 is a graph of beam intensity versus cross-section location for a typical input beam prior to propagation through the homogenizer of FIG. 4.
Figure 6:
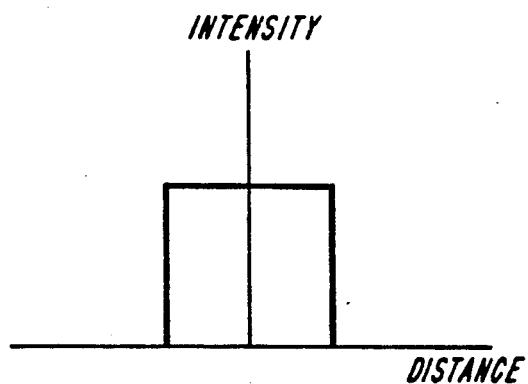
FIG. 6 is a graph of beam intensity versus cross-section location for a typical output beam following propagation through the homogenizer of FIG. 4.

FIGS. 4-6 illustrate the operation of the present invention. In FIG. 4 the input beam from laser (or other light source) 22, having a non-uniform spatial intensity, for example that shown in FIG. 5, enters an homogenizer according to the present invention, e.g., similar to the homogenizer of FIG. 1. Alignment of the beam can be accomplished using lenses or mirrors. As the beam propagates within waveguide 10, the beam reflects off the light reflective surface 12 producing a chaotic overlapping of the light rays. The extensive overlapping causes the light to lose the spatial energy profile and spatial coherence characteristic of the input beam and replace it with one functionally dependent only on the configuration of waveguide 10. Accordingly, by altering the configuration of substructure 14 the beam can be given a variety of spatial profiles, including preferably a homogeneous profile. Upon exiting from waveguide 10, the beam has a substantially more uniform intensity profile similar to that presented in FIG. 6. The homogenized beam may be then reimaged onto a target.

To manufacture the waveguide such as that shown in FIG. 1, semicircular columns, having a radii approximately equal to the desired dimensions of the grooves of substructure 14, can be positioned around the outside of a glass tube. The glass tube and semicircular columns are then drawn in a laminar manner under heat to produce a preform of waveguide 10. Once cooled, the preform can be coated with one or more layers of magnesium fluoride, aluminum, or the like to form an external cladding. After coating is completed, the preform can be dissolved leaving a waveguide 10 having a light reflecting surface 12 with substructure 14.

Using the above apparatus and method, homogeneity of radiant light sources may be achieved. In addition, the apparatus advantageously is not limited by the wavelength of the radiant light, or power thereof.

Although particular embodiments of this invention have been described and illustrated herein, it is recognized that modifications and variations may readily occur to those skilled in the art. Consequently, it is intended that the claims be interpreted to cover such modifications and equivalents.

Having described the invention, what is claimed as new and secured by Letters Patent is:

1. A beam homogenizing apparatus for modifying a radiant energy beam, the apparatus comprising a cylindrical, elongate light transmissive waveguide comprising
    a beam receiving input region at one end of the waveguide which receives an incoming beam at an acute angle between about 2 to 6 degrees relative to the longitudinal axis of the waveguide;
    a beam output region at the opposite end of the waveguide which emits the beam at a direction substantially parallel to the longitudinal axis of the waveguide; and
    a light reflecting surface incorporated within the waveguide and having a substructure which homogenizes said beam as it propagates along the waveguide by multiple reflections.

2. The apparatus of claim 1 wherein said waveguide comprises a solid transmissive medium.

3. The apparatus of claim 2 wherein said light reflecting surface comprises a peripheral surface of the waveguide.

4. The apparatus of claim 1 wherein said waveguide comprises a hollow channel having an inner passageway for transmission of said beam.

5. The apparatus of claim 4 wherein said light reflecting surface is disposed upon an inner surface of the hollow channel.

6. The apparatus of claim 1 wherein said light reflecting surface is coated with a reflection enhancing material.

7. The apparatus of claim 1 wherein said light reflecting surface further comprises a coating material selected from the group consisting of gold, silver and aluminum.

8. The apparatus of claim 7 wherein said light reflecting surface further comprises a protective overglass.

9. The apparatus of claim 8 wherein said overglass is magnesium fluoride.

10. The apparatus of claim 1 wherein said substructure comprises grooves extending substantially parallel to the direction of light propagation.

11. A method of modifying a radiant energy beam, the method comprising:
    disposing an homogenizing element comprising a cylindrical, elongate light transmissive waveguide and a light reflecting surface incorporated within the waveguide having a substructure along at least a portion of the propagation path between a beam source and a target;
    projecting said beam through said homogenizing element at an acute angle relative to the longitudinal axis of the waveguide; and
    permitting said beam to reflect off the light reflecting surface as the beam propagates along the length of the homogenizing element;
    whereby the substructure of the light reflecting surface acts to homogenize said beam as the beam reflects off the light reflecting surface during propagation along the length of the homogenizing element.

12. The method of claim 11 wherein the acute angle ranges from about 2 to about 6 degrees relative to the longitudinal axis of the homogenizing element.

13. The method of claim 11 wherein the method further comprises maintaining a controlled ambient environment within said homogenizing element.

14. The method of claim 13 wherein said homogenizing element is evacuated to maintain a controlled ambient environment.

15. The method of claim 13 wherein said homogenizing element is filled with an inert gas to maintain a controlled ambient environment.

16. The method of claim 11 wherein the step of disposing a homogenizing element along the propagation path further comprises disposing a waveguide having a grooved light reflecting substructure along at least a portion of path between a beam source and a target.

17. The method of claim 16 wherein the method further includes disposing a waveguide having hollow lumen with an inner light reflecting surface along said path.

18. The method of claim 16 wherein the method further includes disposing a waveguide having a solid light transmissive structure with a peripheral light reflecting surface along said path.

19. The method of claim 11 wherein the method further comprises employing the homogenizing element to produce a chaotic overlapping of light rays in a manner that causes the radient energy beam to lose its original spatial energy profile and coherence.

* * * * *